United States Patent [19]
Moro et al.

[11] Patent Number: 5,216,777
[45] Date of Patent: Jun. 8, 1993

[54] FUZZY CONTROL APPARATUS GENERATING A PLURALITY OF MEMBERSHIP FUNCTIONS FOR DETERMINING A DRIVE CONDITION OF AN ELECTRIC VACUUM CLEANER

[75] Inventors: Masaru Moro; Tadashi Matsuyo, both of Yokaichi; Seiji Yamaguchi, Shiga; Shuji Abe, Kakogawa; Hidetoshi Imai, Yokaichi, all of Japan

[73] Assignee: Matsushita Electric Industrial Co., Ltd., Osaka, Japan

[21] Appl. No.: 796,400

[22] Filed: Nov. 22, 1991

[30] Foreign Application Priority Data

Nov. 26, 1990 [JP] Japan .................................. 2-323675
May 21, 1991 [JP] Japan .................................. 3-115981

[51] Int. Cl.$^5$ .............................................. A47L 9/28
[52] U.S. Cl. ...................................... 15/319; 395/61; 395/900
[58] Field of Search .................... 395/900, 61; 15/319

[56] References Cited

U.S. PATENT DOCUMENTS

| | | | |
|---|---|---|---|
| 4,601,082 | 7/1986 | Kurz | 15/319 |
| 4,760,896 | 8/1988 | Yamaguchi | 395/61 |
| 4,862,854 | 9/1989 | Oda et al. | 395/900 |
| 4,905,579 | 3/1990 | Dame | 454/238 |
| 4,958,288 | 9/1990 | Takahashi | 395/900 |

*Primary Examiner*—Michael R. Fleming
*Assistant Examiner*—Jodi E. Tryon
*Attorney, Agent, or Firm*—Ratner & Prestia

[57] ABSTRACT

A control apparatus of an electrical appliance comprising a sensor for detecting a physical amount; and a fuzzy inferring device for determining the drive condition of a load by fuzzy inference based on a signal outputted from the sensor, and wherein the sensor has at least one normalized membership function to be used by fuzzy inference and achieves a plurality of membership functions which can be expressed by congruent curves by performing a predetermined subtraction or an addition on the signal outputted from the sensor.

3 Claims, 10 Drawing Sheets

5,216,777

FUZZY CONTROL APPARATUS GENERATING A PLURALITY OF MEMBERSHIP FUNCTIONS FOR DETERMINING A DRIVE CONDITION OF AN ELECTRIC VACUUM CLEANER

BACKGROUND OF THE INVENTION 1. (a) Field of the Invention

The present invention relates to the control apparatus of a vacuum cleaner having a fuzzy inferring device for performing fuzzy inference.

2. (b) Description of the Related Arts

Recently, in the control apparatus of a vacuum cleaner, a sensor detects a physical quantity to be controlled and the operation of a load is controlled by fuzzy inference according to the output of the sensor.

Referring to FIGS. 12 and 13, a conventional control apparatus of an air cleaner, having a sensor, for controlling the number of rotations of a motor is described below as an example of the control apparatus of an electrical appliance of this kind.

A gas sensor 21 detects the concentration of gas in air, thus converting the concentration into an electric signal such as a voltage. The gas sensor 21 outputs an electric signal to a fuzzy inferring device 22. The fuzzy inferring device 22 performs a calculation based on the output of the gas sensor 21 and determines the number of rotations and drive period of time of a fan motor 23, thus outputting the result obtained by the calculation to a control means 24. The control means 24 controls the rotation of the fan motor 23 according to the number of rotations determined by the fuzzy inferring device 22.

The fuzzy inferring device 22 performs a calculation based on fuzzy inference so as to determine the number of rotations of the fan motor 23. Supposing that the output of the gas sensor 21 is at a point (G) shown in FIG. 13, of variation concentration membership functions, the weight of "ordinary" membership function is approximately ⅔ and that of "many" membership is approximately ¼. The fuzzy inferring device 22 determines the number of rotations of the fan motor 23 in combination of membership functions based on a rule (not shown) of inferring the number of rotations and calculates the center of gravity. In response to the information outputted from the inferring device 24, the control means 24 controls the rotation of the fan motor 23.

According to the above-described control apparatus of the conventional electrical equipment, if the number of membership functions is high, a great amount of storage capacity for memorizing them is required.

Similarly to an air cleaner, vacuum cleaners in which the number of rotations of a motor can be varied are increasingly manufactured with the variety of objects to be cleaned. In using fuzzy inference to control the number of rotations of the motor, the fuzzy inferring device is required to have a large storage capacity is required to store a large number of membership functions.

SUMMARY OF THE INVENTION

Accordingly, an essential object of the present invention is to provide the control apparatus of an electrical appliance in which membership functions to be used by fuzzy inference can be achieved with a small storage capacity.

In accomplishing these and other objects, there is provided a control apparatus of an electrical appliance comprising: a sensor for detecting a physical amount; and a fuzzy inferring device for determining the drive condition of a load by fuzzy inference based on a signal outputted from the sensor. The sensor has at least one normalized membership function to be used by fuzzy inference and achieves a plurality of membership functions which can be expressed by congruent curves by performing a predetermined subtraction or an addition on the signal outputted from the sensor.

According to the above-described construction, when fuzzy inference is performed based on a signal outputted from the sensor, a predetermined calculation is performed on the signal outputted from the sensor by using one membership function and a plurality of membership functions can be obtained with a small storage capacity. Since many membership functions can be easily obtained, a high-degree fuzzy inference can be accomplished.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
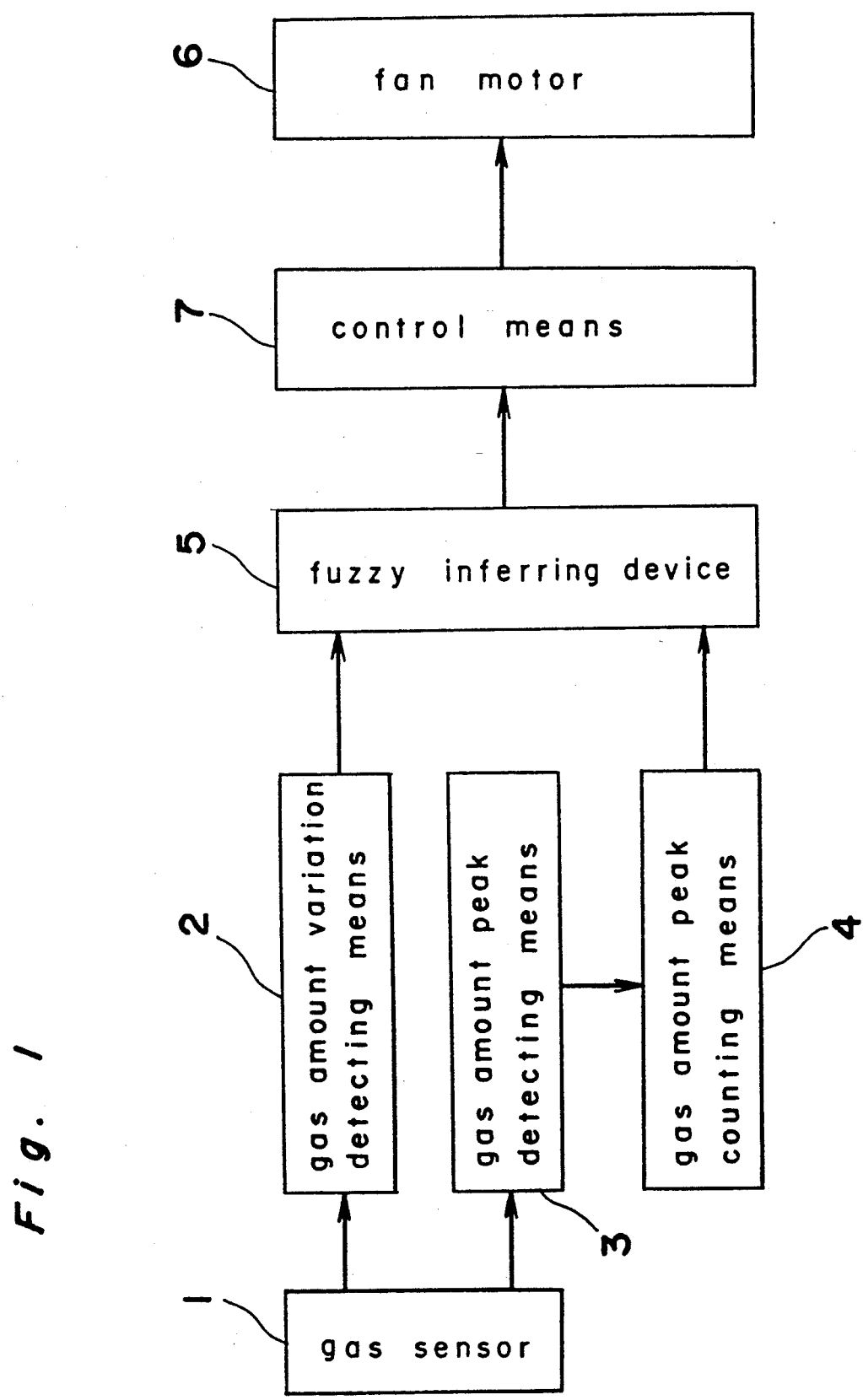
FIG. 1 is a block diagram showing a control apparatus of an electric appliance according to a first embodiment of the present invention.

Before the description of the present invention proceeds, it is to be noted that like parts are designated by like reference numerals throughout the accompanying drawings.

A first embodiment of the present invention will be described below with reference to FIGS. 1 through 3. A gas sensor converts a detected gas amount into an electric signal. A variation detecting means 2 for detecting the variation of the gas amount detects the variation of the amount of gas detected by the gas sensor 1. A peak detecting means 3 for detecting the peak of the gas amount detects the peak of the gas amount detected by the gas sensor 1. A peak counting means 4 counts the peak of the gas amount detected by the peak detecting means 3. A fuzzy inferring device 5 infers the number of rotations of a fan motor 6 based on the output of the peak counting means 4 and the output of the detecting means 2 in a peak time. A control means 7 calculates a voltage for driving the fan motor 6 based on the number of rotations inferred by the fuzzy inferring device 5, thus controlling the rotation of the fan motor 6.

Figure 2:
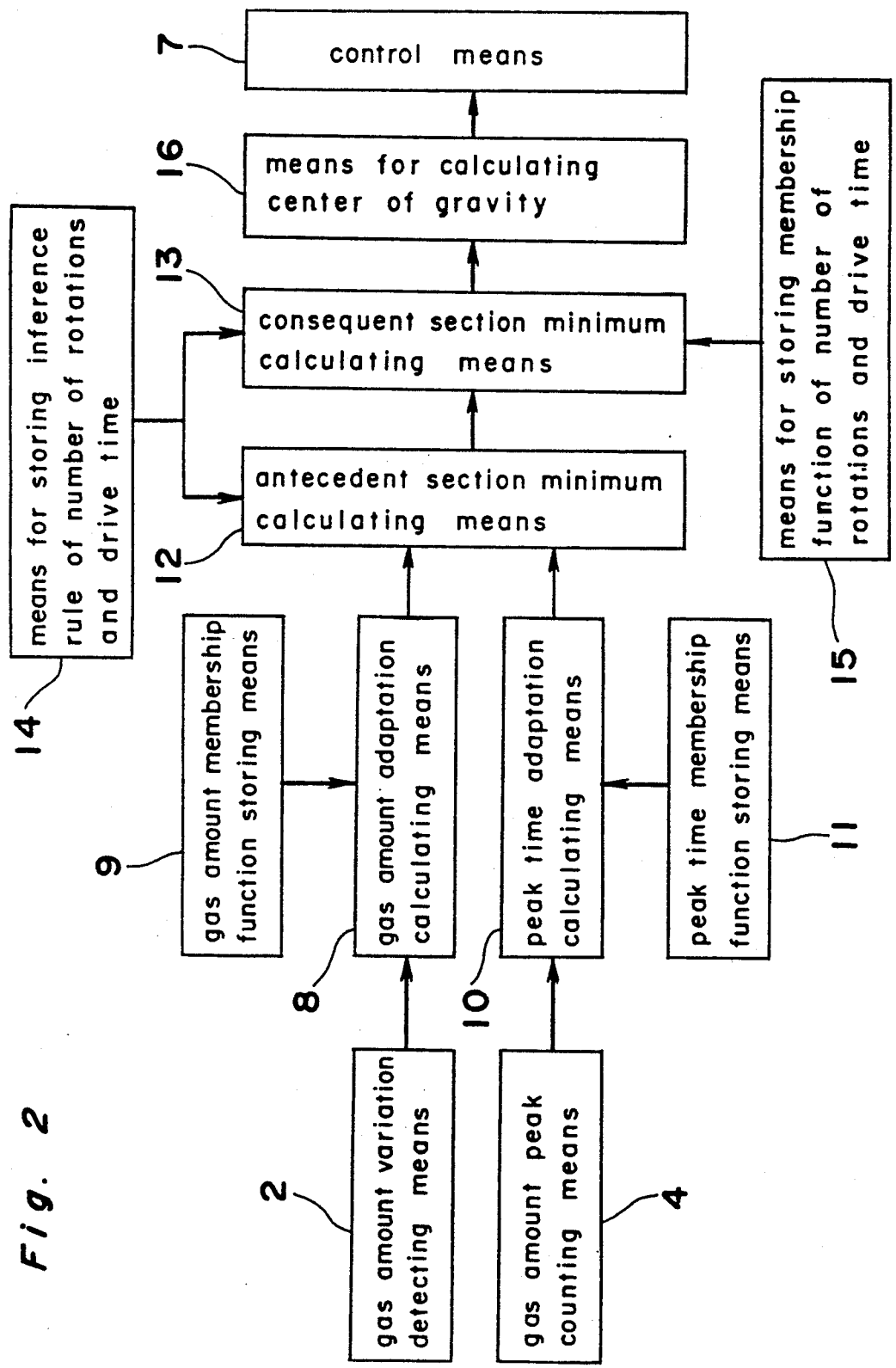
FIG. 2 is a block diagram of a fuzzy inferring device of the control apparatus.

The fuzzy inferring device 5 comprises means shown in FIG. 2. A gas amount adaptation calculating means 8 finds the adaptation of the input thereto from a variation detecting means 2 and the adaptation of a membership function stored in a variation membership function storing means 9 by taking the maximum of both adaptations. Similarly, a peak time adaptation calculating means 10 finds the adaptation of the input thereto from the peak counting means 4 and the adaptation of a membership function stored in a peak time membership function storing means 11. The variation membership function storing means 9 and the peak time membership function storing means 11 store at least one normalized membership function shown in FIG. 3. The gas amount adaptation calculating means 8 and the peak time adaptation calculating means 10 perform a predetermined subtraction, respectively. Thus, a plurality of membership functions which can be expressed in congruent curves is obtained. An antecedent section minimum calculating means 12 takes the minimum of the above-described two adaptations, thereby setting the minimum value thus obtained as the adaptation of the antecedent section. According to a rule stored in a means 14 for storing the number of rotations/drive time inference rule, a consequent section minimum calculating means 13 takes the minimum of the adaptation of the antecedent section and the number of the rotations/drive time membership function of the consequent section stored in a means 15 for storing the number of rotations/drive time membership function according to a rule stored in the means 14 for storing the number of rotations/drive time inference rule, thus setting the minimum value as the conclusion of the rule. A center of gravity calculating means 16 finds the conclusion of each rule and then, takes the maximum of each conclusion and calculates the center of gravity of the maximums, thus finding the number of rotations and the drive time of the fan motor 6. A microcomputer is capable of serving as the fuzzy inferring device 5. The control means 7 calculates a voltage for driving the fan motor 6 based on the determined number of rotations and drive time, thus controlling the rotation of the fan motor 6.

The operation of the air cleaner of the above-described construction is described below. The absolute magnitude of a gas amount detected by the gas sensor 1 depends on the foulness degree of air. The period of time counted by the peak detecting means 3 and the peak counting means 4 depends on the duration of air foulness and the flow speed of air. Accordingly, the foulness degree of air can be discriminated by the output of the gas sensor 1, and the situation of gas generation and air flow in the surrounding atmosphere can be discriminated by the output of the peak counting means 4. The characteristic of the present foulness condition of air and the situation of the gas generation as well as the air flow in the surrounding atmosphere can be estimated by the variation of the gas amount and the period of time required to reach a peak calculated by the variation detecting means 2 and the peak counting means 4. The most appropriate number of rotations of the fan motor 6 in cleaning air is determined by a gas amount which can be inferred by the fuzzy inferring device 5.

The process of inferring the number of rotations and drive time of the fan motor 6 is described below. The fuzzy rule of the embodiment is carried out based on judgements of "when gas is contained in air in a great amount and the period of time required for a peak to be attained is long, i.e., if gas is generated continuously, the number of rotations of the fan motor 6 is high and the drive time thereof is long." and "when gas is contained in air in a small amount and the period of time required for a peak to be attained is short, i.e., if gas is generated temporarily, the number of rotations of the fan motor 6 is low and the drive time thereof is short." The qualitative concepts of the gas amount is "great", the time required for a peak to be attained is "short" or the number of rotations of the fan motor 6 is "high" are quantitatively expressed by a membership function.

Figure 4:
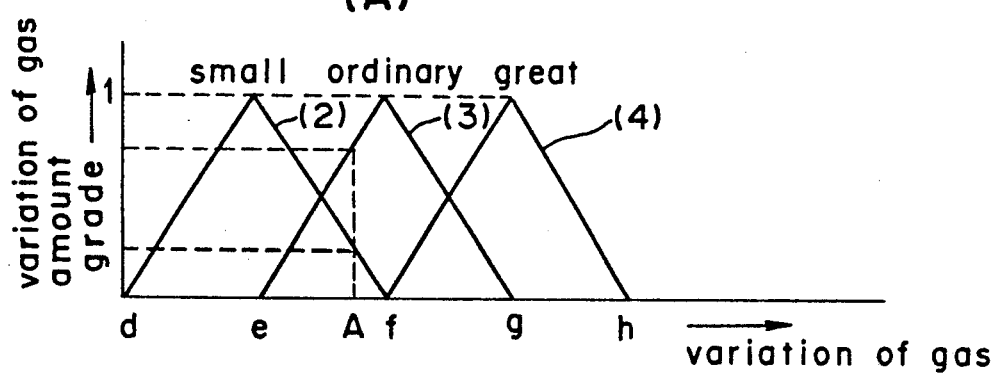
FIGS. 4A through 4D are views showing membership functions to be used by an inferring device in performing fuzzy inference according to a second embodiment of the present invention.
Figure 4:
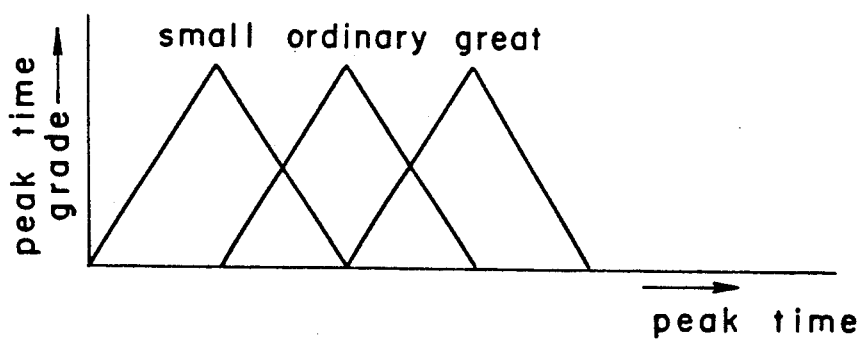
Figure 4:
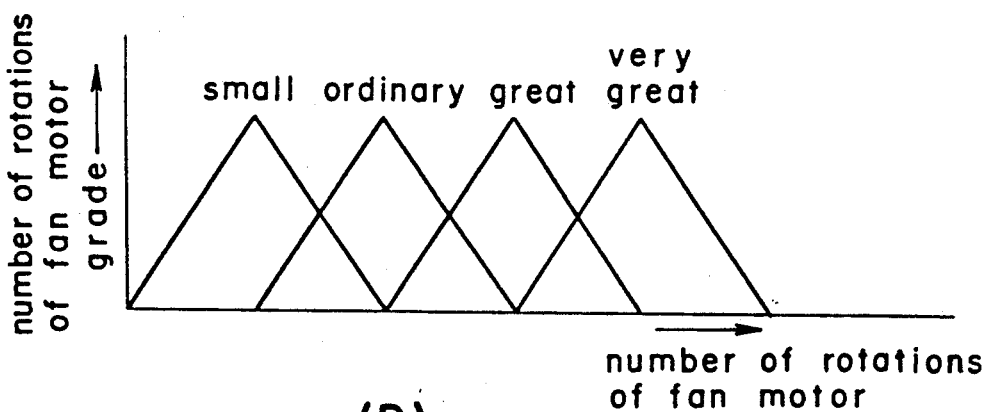
Figure 4:
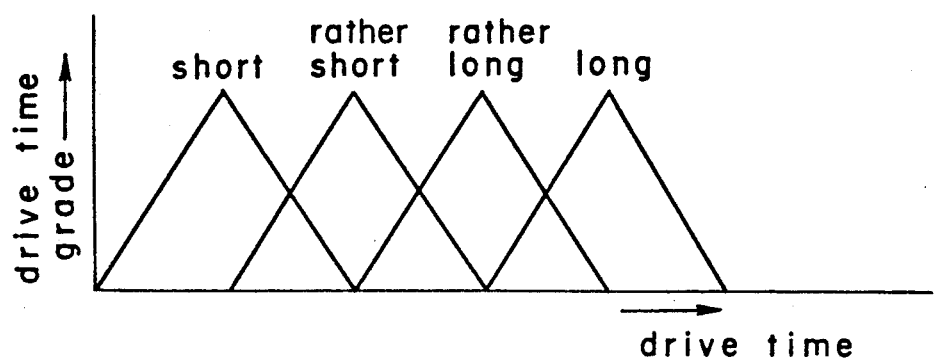
Figure 5:
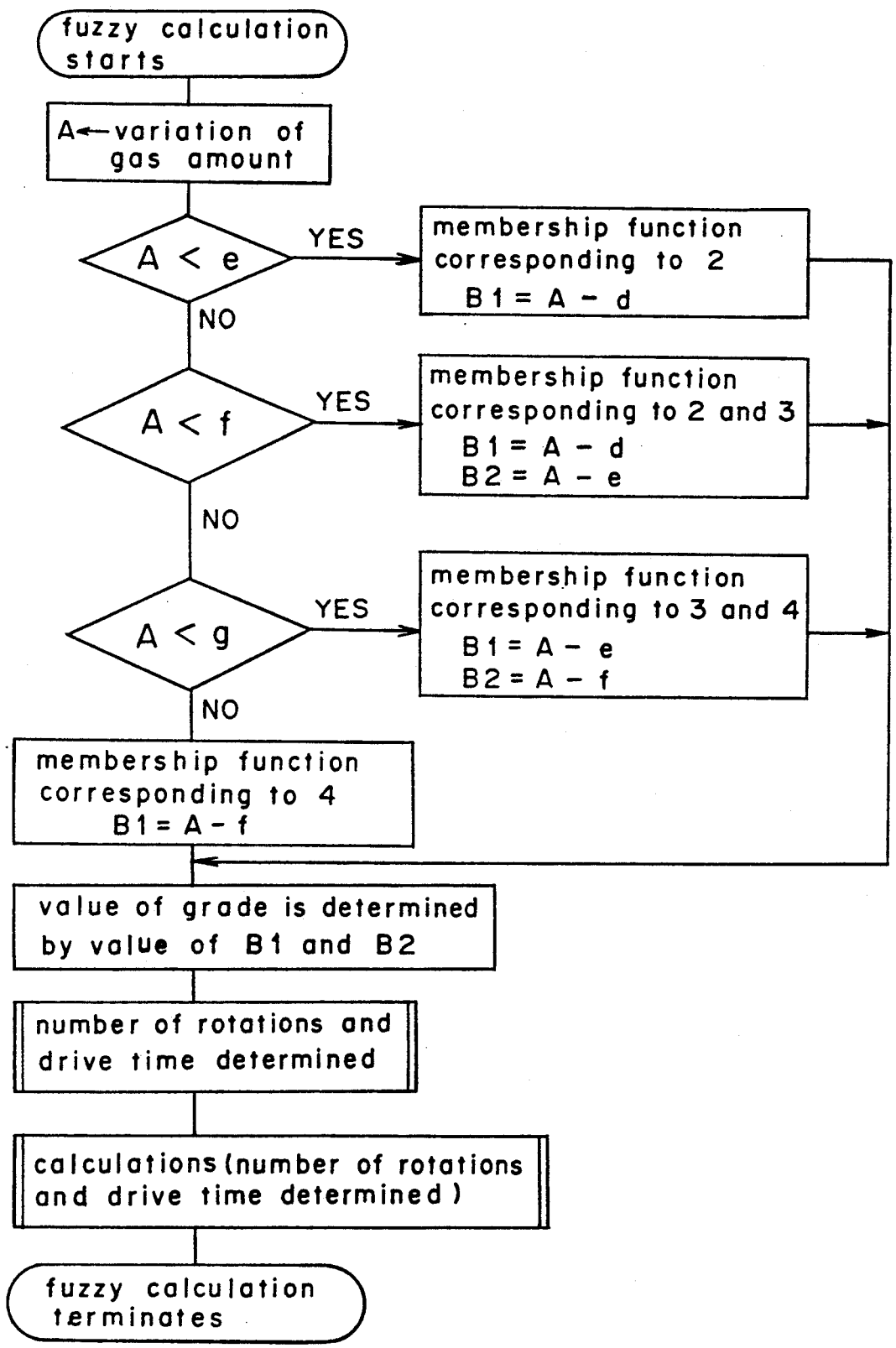
FIG. 5 is a flowchart for obtaining a membership function to be used by the inferring device in performing fuzzy inference.

A plurality of membership functions which can be expressed by congruent curves are obtained by performing a predetermined subtraction from one normalized membership function. That is, the gas amount adaptation calculating means 8 performs a predetermined subtraction from a membership function 1, shown in FIG. 3, stored in the variation membership function storing means 9 so as to obtain a plurality of membership functions 2, 3, and 4 (as shown in FIG. 4A) which can be expressed by congruent curves having reference points at (d), (e), (f), and (g). First, it is retrieved which of membership functions 2, 3, and 4 corresponds to the variation of a gas amount. For example, when the variation of the gas amount shown by (A) of FIG. 4 is detected, (A) is greater than (d) and (e) and smaller than (f). Therefore, the variation (A) of the gas amount corresponds to the membership functions 2 and 3. Then, a value corresponding to the point (a) of the corresponding membership function is subtracted from the variation (A). Since the point (A) corresponds to the membership functions 2 and 3, subtractions of A−d and A−e are performed. The values of the subtractions are applied to the membership function 1. Therefore, supposing that the variation of a gas amount is expressed by (A), the grade of the membership function 2 corresponding to the value of A−d is ¼ in the membership function 1 and the grade of the membership function 3 corresponding to the value of A−e is ¾ in the membership function 1. Similarly, when a gas concentration corresponds to the membership function 4, a value obtained by subtracting the value of (f) from the variation of a gas amount is applied to the membership function 1. Thus, the grade of the membership function 4 can be found. FIG. 5 is a flowchart for carrying out the embodiment. Although three membership functions are shown in FIG. 4A, many membership functions can be obtained if they are congruent with the membership function 1.

In this embodiment, since the left end point (a) (gas amount, grade) thereof is set at (0, 0) in the above-described normalized membership function 1 in order to find the grades of the membership functions 2 and 3, subtractions are performed between the variations of gas amounts. Needless to say, it is necessary to perform an addition when a different point is set as the reference point of the normalized membership function 1.

Figure 3:
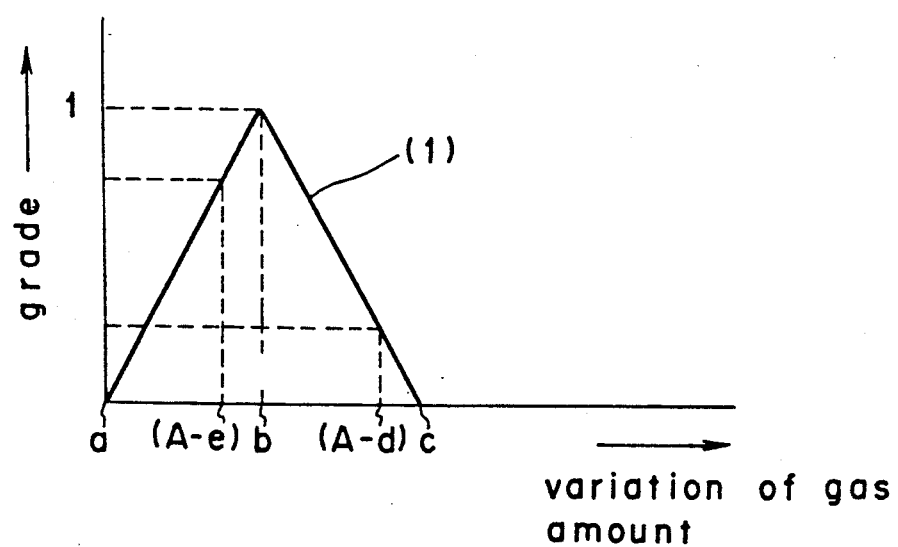
FIG. 3 is a view showing an example of a membership function to be stored by the inferring device.

Similarly, based on one normalized membership function, shown in FIG. 3, stored in the peak time membership function storing means 11, the peak time adaptation calculating means 10 performs a predetermined subtraction so that a plurality of membership functions shown in FIG. 4B can be obtained. FIGS. 4C and 4D show membership functions stored in the means 15 for storing the number of rotations/drive time membership function. It is possible to obtain a plurality of membership functions from one membership function similarly to the above.

In the fuzzy inferring device 5, the gas amount adaptation calculating means 8 finds the adaptation of the input thereto from a variation detecting means 2 and the adaptation of a membership function stored in the variation membership function storing means 9 and obtained by a predetermined subtraction by taking the maximum of both adaptations. Similarly, the peak time adaptation calculating means 10 finds the adaptation of the input thereto from the peak counting means 4 and the adaptation of a membership function stored in the peak time membership function storing means 11 and obtained by a predetermined subtraction. The antecedent section minimum calculating means 12 takes the minimum of the above-described two adaptations, thereby setting the minimum value thus obtained as the adaptation of the antecedent section. According to a rule stored in the means 14 for storing the number of rotations/drive time inference rule, a consequent section minimum calculating means 13 takes the minimum of the adaptation of the antecedent section and the number of the rotations/drive time membership function of the consequent section stored in the means 15 for storing the number of rotations/drive time membership function according to a rule stored in the means 14 for storing the number of the rotations/drive time inference rule, thus setting the minimum value as the conclusion of the rule. A center of gravity calculating means 16 finds the conclusion of each rule and then, takes the maximum of each conclusion and calculates the center of gravity of the maximums, thus finding the number of rotations and the drive time of the fan motor 6. The control means 7 calculates a voltage for driving the fan motor 6 based on the determined number of rotations and drive time, thus controlling the rotation of the fan motor 6.

A second embodiment of the present invention is described below with reference to FIGS. 6 and 7.

Figure 6:
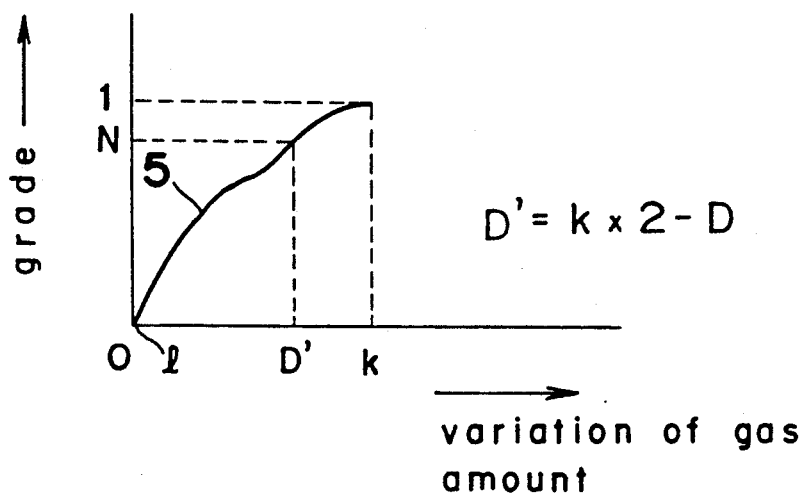
FIG. 6 is a view showing an example of a membership function to be stored by a fuzzy inferring device according to a second embodiment of the present invention.
Figure 7:
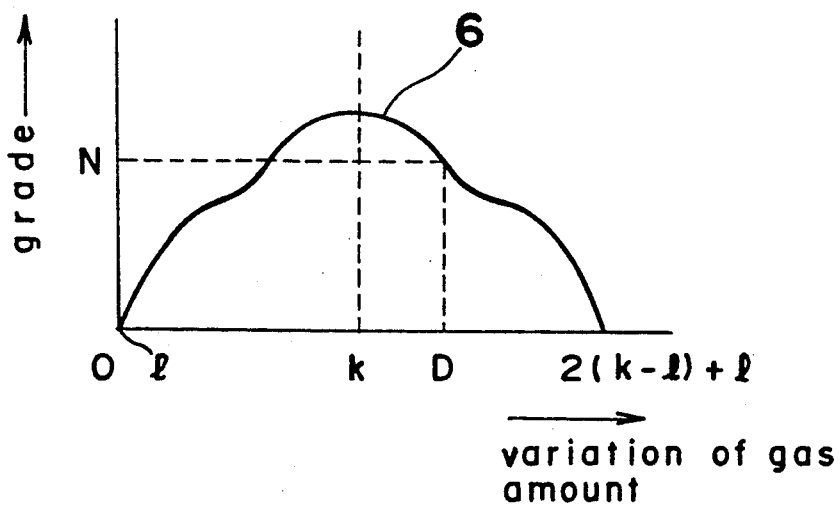
FIG. 7 is a view showing a membership function to be used by the inferring device in performing fuzzy inference.
Figure 8:
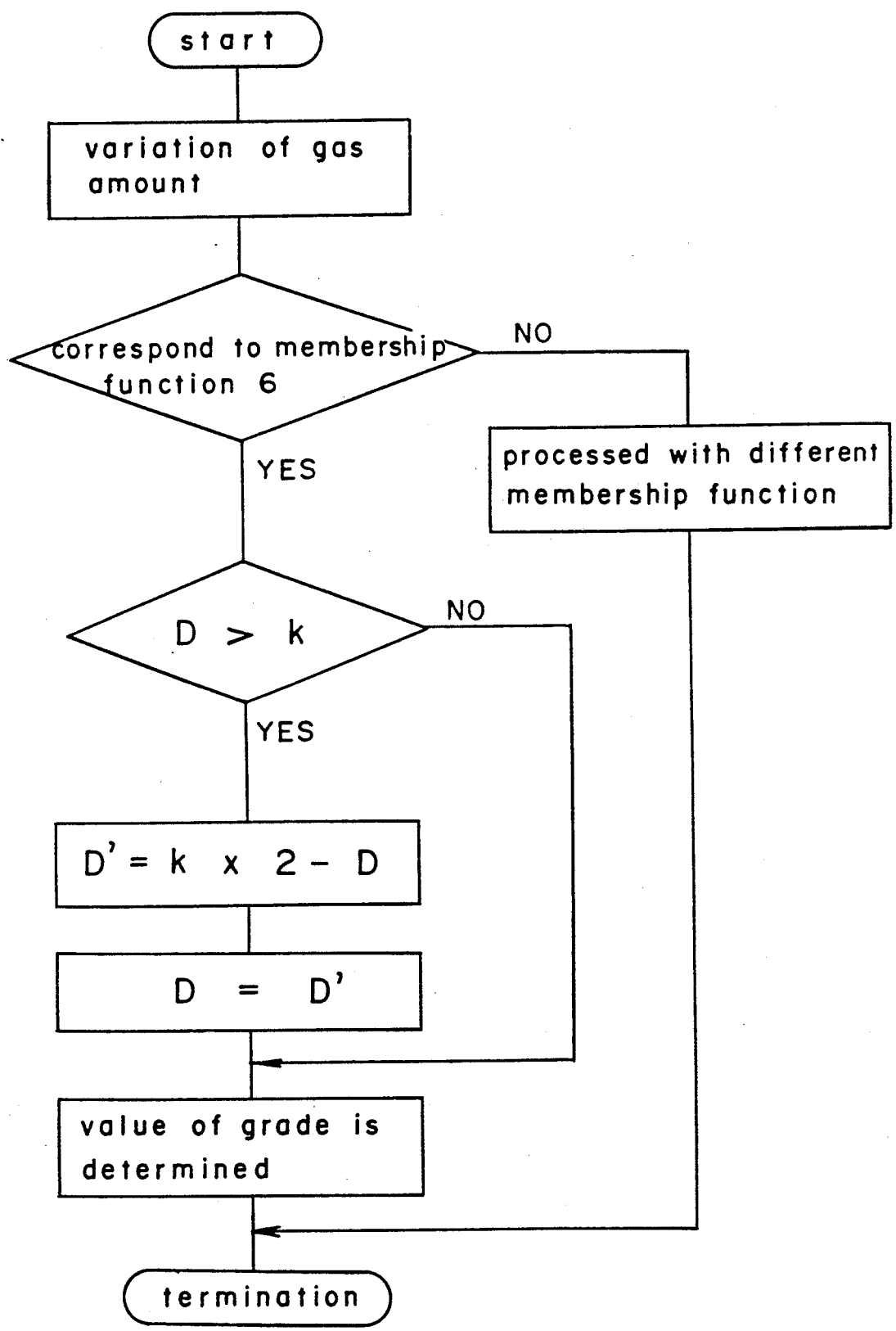
FIG. 8 is a flowchart for obtaining a membership function to be used by the inferring device in performing fuzzy inference.

A membership function 5 shown in FIG. 6 is stored in the variation membership function storing means 9. A membership function 6 shown in FIG. 7 is a membership function to be obtained by the present invention. The membership function 6 is identical to the membership function 5 in the region less than a value shown by (k) and symmetrical with respect to (k). Referring to FIG. 6, when the variation of a gas amount is less than (k), the grade of the membership function 6 can be easily found based on the membership function 5. When the variation shown by (D) is detected, a calculation of $D' = k \times 2 - D$ is performed and the value of (D') is applied to the membership function 5 so as to determine the grade of the membership function 6. Similarly, the peak time adaptation calculating means 10 performs a predetermined calculation based on a membership function, shown in FIG. 6, stored by the peak time membership function storing means 11. Thus, a membership function shown in FIG. 7 can be obtained. FIG. 8 is a flowchart for carrying out the embodiment.

A third embodiment of the present invention is described below with reference to FIGS. 9 and 10.

Figure 9:
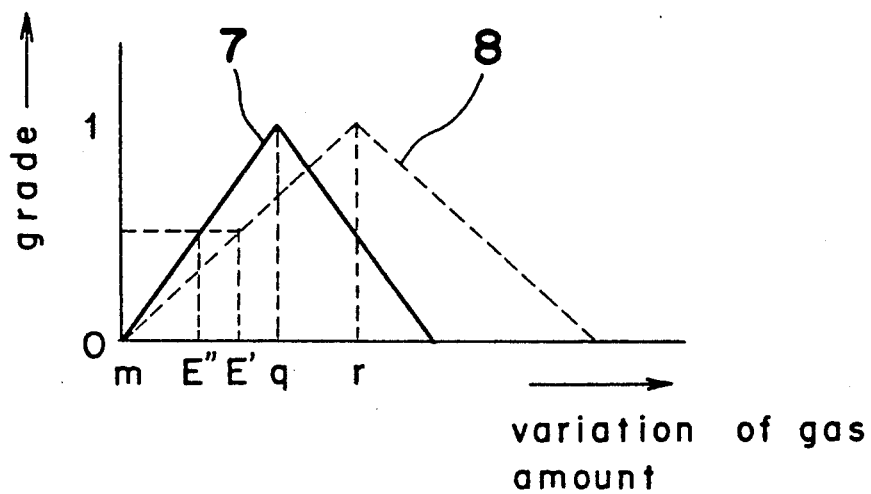
FIG. 9 is a view showing another example of a membership function to be stored by a fuzzy inferring device according to a third embodiment of the present invention.
Figure 10:
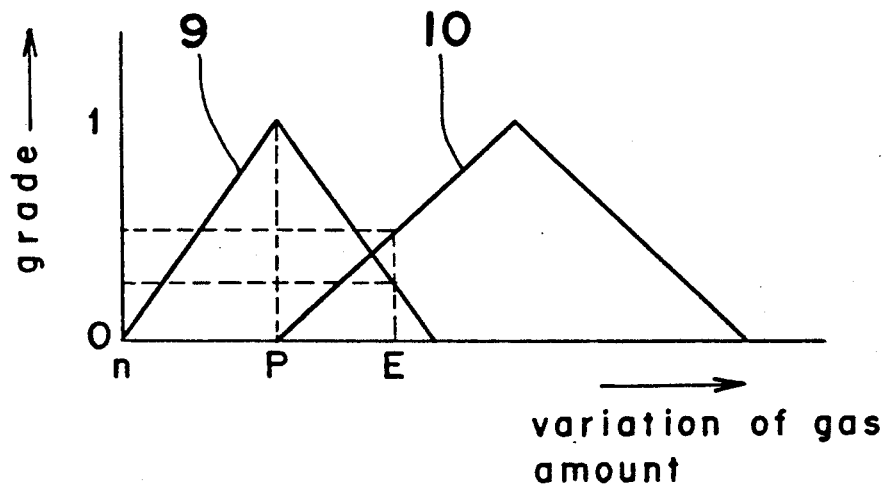
FIG. 10 is a graph which is useful for obtaining a membership function to be used by the inferring device in performing fuzzy inference.

FIG. 9 shows the principle of the present invention. A predetermined calculation is performed on the variation of a gas amount so as to obtain a membership function 8. For example, supposing that the variation membership function storing means 9 stores a membership function 7, the grade of a membership function 9 can be easily determined when the variation shown by (E) of FIG. 10 is detected. In order to find the grade of a membership function 10, (E') is obtained by subtracting (p) from the variation (E) so as to obtain the membership function 8. Then, (E'') is obtained by the product of (E') and the ratio of the membership function 7 to the membership function 8 (q/r). Thus, the grade of the membership function 7 is obtained at this value.

According to the present invention, the control apparatus of an electrical appliance comprises: a sensor for detecting a physical amount; and a fuzzy inferring device for determining the drive condition of a load by fuzzy inference based on a signal outputted from the sensor. The sensor has at least one normalized membership function to be used by fuzzy inference and achieves a plurality of membership functions which can be expressed by congruent curves by performing a predetermined subtraction or an addition on the signal outputted from the sensor. Therefore, membership functions can be stored with a greatly reduced storage capacity by obtaining a plurality of membership functions from one membership function. Since many membership functions can be easily obtained, a high-degree fuzzy inference can be accomplished.

Figure 11:
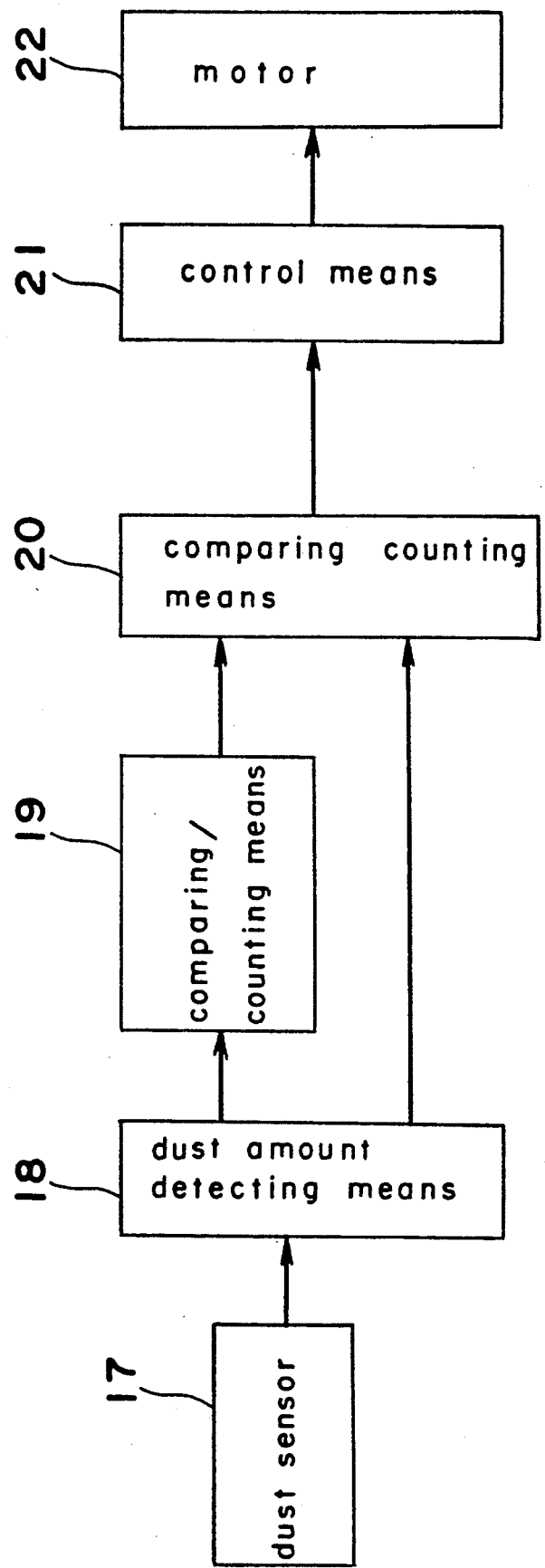
FIG. 11 is a block diagram of a vacuum cleaner having a dust sensor according to a fourth embodiment of the present invention.
Figure 12:
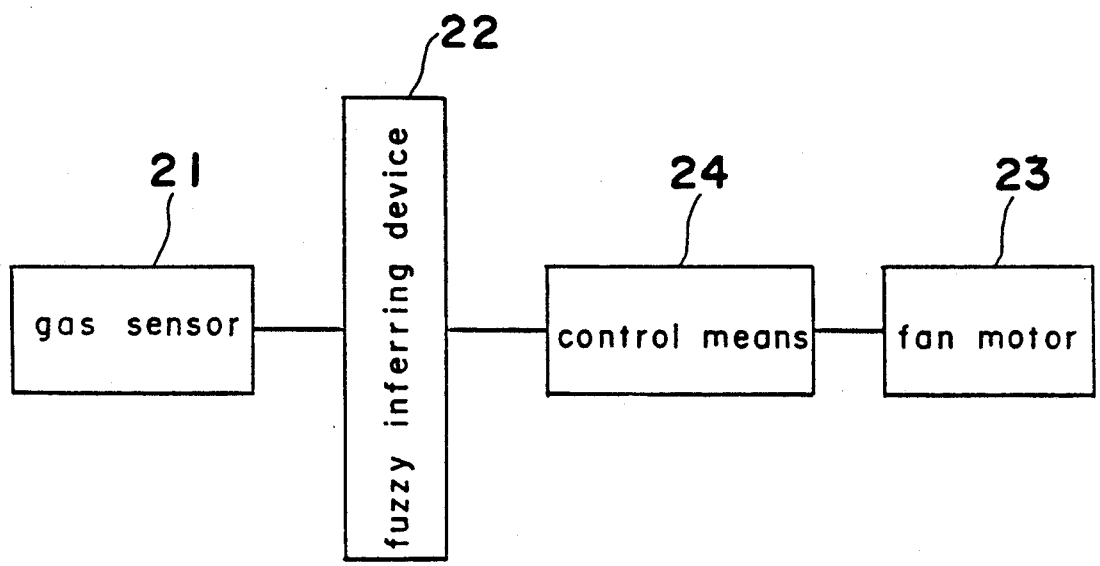
FIG. 12 is a block diagram showing the control apparatus of a conventional electric appliance.
Figure 13:
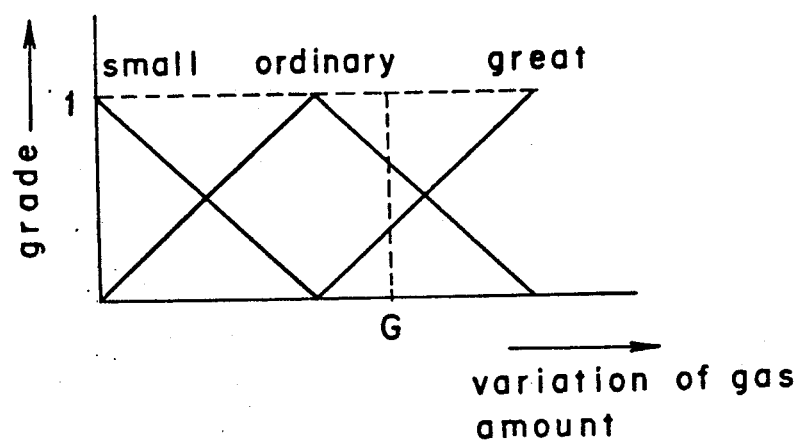
FIG. 13 is a view showing a membership function to be stored by the fuzzy inferring device of the control apparatus.

A fourth embodiment of the present invention is described with reference to FIG. 11 showing the block diagram of the control apparatus of a vacuum cleaner. The description of the same construction and operation of the fourth embodiment as those of the above-described embodiments are omitted.

A dust sensor 17 comprising a light emitting section (not shown) and a light receiving section (not shown) opposed to each other is provided on an air passage. Dust sucked by the vacuum cleaner passes between the light emitting section and the light receiving section. The dust sensor 17 outputs pulse signals to a dust detecting means 18 which counts the number of pulse signals per unit time. In response to pulse signals from the dust detecting means 18, a comparison/counting means 19 counts, in a predetermined period of time, how many times the amount of dust has exceeded a predetermined amount within unit time. A fuzzy inferring device 20 infers the number of rotations of a fan motor based on the output of pulse signals outputted from the dust detecting means 18 and signals outputted from the comparison/counting means 19. A control means 21 calculates a voltage for driving the fan motor based on the number of rotations of the fan motor inferred by the fuzzy inferring device 20, thus controlling the rotation of the fan motor.

Needless to say, the absolute magnitude of a dust amount detected by the dust detecting means 18 depends on the amount of dust on a floor. The value counted by the comparison/counting means 19 is great when dust successively passes through the dust sensor 17 and small when dust passes through the dust sensor 17 temporarily. Accordingly, the foulness degree of the floor can be decided by the output of the dust detecting means 18 and the kind of the floor can be decided by the output of the comparison/counting means 19.

Depending on the foulness degree and condition of the floor, the fuzzy inferring device 20 infers the number of rotations of the fan motor according to the output of the dust detecting means 18 and the comparison/counting means 19.

The fuzzy inferring device 20 to be used in the fourth embodiment is the same as those used in the first through the third embodiment. Membership functions can be obtained by fuzzy inference with a small storage capacity.

In the first through fourth embodiment, a plurality of membership functions can be obtained by performing a subtraction or a multiplication on one normalized membership function. However, if the number of membership functions to be obtained is high, a plurality of membership functions may be obtained based on a plurality of normalized membership functions by performing subtractions or multiplications. Although a great number of membership functions to be obtained is high, the same operation and effect as those of the first through the fourth embodiment can be obtained by reducing the storage capacity.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric vacuum cleaner including a suction channel, said electric vacuum cleaner comprising:
    a fan motor for generating suction force to draw dust particles through said suction channel;
    dust detecting means for detecting dust particles passing through said suction channel and for generating a signal responsive to the quantity of dust particles;
    dust counting means for counting each generation of said signal by said dust detecting means in a given interval and for generating a further signal based upon said count;
    fuzzy inferring means for processing said further signal and a normalized membership function in order to generate a plurality of membership functions, each of said plurality of membership functions having a curvature substantially identical to the said normalized membership function, said fuzzy estimation means further including means for determining a drive condition based upon said plurality of membership functions; and
    power control means for controlling the fan motor in accordance with the drive condition determined by the fuzzy estimation means.

2. An electric vacuum cleaner as defined in claim 1, wherein said plurality of membership functions each includes a curve symmetrical with respect to a given point which is determined by performing a predetermined subtraction or addition on said signal generated by said dust detecting means.

3. An electric vacuum cleaner as defined in claim 1, wherein said plurality of membership functions each have a different rate of change which is determined by performing a predetermined multiplication on said signal generated by said dust detecting means.

* * * * *